(12) United States Patent
Schroeder

(10) Patent No.: US 8,231,944 B1
(45) Date of Patent: Jul. 31, 2012

(54) METHOD OF USING SILICONE COATING COMPOSITION AS A TIRE SHINE

(75) Inventor: Carolyn J. Schroeder, Florham Park, NJ (US)

(73) Assignee: AB Specialty Silicones, LLC, Short Hills, NJ (US)

( * ) Notice: Subject to any disclaimer, the term of this patent is extended or adjusted under 35 U.S.C. 154(b) by 1073 days.

(21) Appl. No.: 11/617,511

(22) Filed: Dec. 28, 2006

Related U.S. Application Data

(63) Continuation-in-part of application No. 10/899,453, filed on Jul. 26, 2004, now Pat. No. 7,198,205.

(60) Provisional application No. 60/489,818, filed on Jul. 24, 2003, provisional application No. 60/754,787, filed on Dec. 28, 2005, provisional application No. 60/783,331, filed on Mar. 16, 2006.

(51) Int. Cl.
*B05D 1/02* (2006.01)

(52) U.S. Cl. ............ 427/427.4; 427/427.6; 524/366; 524/378; 528/18; 528/34; 528/43

(58) Field of Classification Search .................. None
See application file for complete search history.

(56) References Cited

U.S. PATENT DOCUMENTS

| | | | |
|---|---|---|---|
| 4,218,359 A | 8/1980 | Marwitz et al. | |
| 4,495,168 A | 1/1985 | Schmolka | |
| 4,534,959 A | 8/1985 | Schmolka | |
| 4,568,718 A | 2/1986 | Huebner et al. | |
| 4,584,324 A | 4/1986 | Bauman et al. | |
| 5,114,764 A * | 5/1992 | Perrin ...................... | 428/35.5 |
| 5,502,144 A | 3/1996 | Kuo et al. | |
| 5,650,146 A | 7/1997 | Shaw | |
| 6,200,964 B1 | 3/2001 | Singleton et al. | |
| 6,306,998 B1 | 10/2001 | Kimura et al. | |
| 6,352,699 B1 | 3/2002 | Mondet et al. | |
| 6,384,023 B2 | 5/2002 | Singleton et al. | |
| 6,387,357 B1 | 5/2002 | Chopra et al. | |
| 6,403,067 B1 | 6/2002 | Schamper et al. | |
| 6,468,512 B1 | 10/2002 | Carmody | |
| 6,562,324 B1 | 5/2003 | Kumar et al. | |
| 6,576,623 B1 | 6/2003 | Nakanishi et al. | |
| 6,756,425 B2 | 6/2004 | Mogi et al. | |
| 7,198,205 B1 | 4/2007 | Solomon et al. | |
| 2007/0178321 A1 * | 8/2007 | Haas ...................... | 428/447 |

FOREIGN PATENT DOCUMENTS

| | | | |
|---|---|---|---|
| JP | 03-072582 A | * | 3/1991 |
| JP | 07-310055 A | * | 11/1995 |
| JP | 2005-154535 A | * | 6/2005 |

OTHER PUBLICATIONS

Machine translation of JP 07-310055.*
Information about Dow Corning Toray Silicone SD 8000 from http://www.dowcorning.co.jp/applications/search/products/details.aspx?prod=02562723&type=MATL (translated by Google).*
Information about Dow Corning Toray Silicone PRX 305 from http://tienchen.com/productDetalis.asp?id=445 (translated by Google).*

* cited by examiner

*Primary Examiner* — Marc Zimmer
(74) *Attorney, Agent, or Firm* — Garvey, Smith, Nehrbass & North, L.L.C.; Seth M. Nehrbass; Julia M. FitzPatrick

(57) ABSTRACT

A silicone polymer gel/coating which can be sprayed from an aerosol can preferably has a viscosity of 2,000-5,000 cps. and provides a moisture resistant coating of preferably 20-30 mils to protect components in telephone installation and maintenance applications. It is preferably sprayed from a can using Spray Actuator OTP 0025. It preferably includes a molecular sieve. It can also be used as a tire shine.

17 Claims, 1 Drawing Sheet

METHOD OF USING SILICONE COATING COMPOSITION AS A TIRE SHINE

CROSS-REFERENCE TO RELATED APPLICATIONS

This is a continuation-in-part of U.S. patent application Ser. No. 10/899,453, filed 26 Jul. 2004, now U.S. Pat. No. 7,198,205. This application claims priority of U.S. Provisional Patent Application Ser. No. 60/489,818, filed 24 Jul. 2003; U.S. Provisional Patent Application Ser. No. 60/754,787, filed 28 Dec. 2005; and U.S. Provisional Patent Application Ser. No. 60/783,331, filed 16 Mar. 2006.

Incorporated herein by reference are U.S. patent application Ser. No. 10/899,453, filed 26 Jul. 2004, U.S. Provisional Patent Application Ser. No. 60/489,818, filed 24 Jul. 2003; U.S. Provisional Patent Application Ser. No. 60/754,787, filed 28 Dec. 2005; and U.S. Provisional Patent Application Ser. No. 60/783,331, filed 16 Mar. 2006.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to silicone. More particularly, the present invention relates to silicone sprays.

2. General Background of the Invention

There is a product on the market today that some of the telephone companies use called Revite MDP-30 Moisture Displacement. This product is more a lubricant than a moisture barrier. It is a trichloroethylene-based product.

The following U.S. Patents are incorporated herein by reference:

U.S. Pat. Nos. 4,495,168 4,534,959 5,650,146 6,200,964 6,352,699 6,384,023 6,387,357 6,403,067 6,468,512 6,562,324 6,576,623.

BRIEF SUMMARY OF THE INVENTION

The present invention includes a silicone gel/coating (preferably Shore A Durometer 11-15, e.g. Shore A Durometer 12) which can be sprayed from an aerosol can. The silicone polymer preferably has a viscosity of 70-10,000 cps., and more preferably 2,000-5,000 cps. It is preferably sprayed from a can using Spray Actuator OTP 0025. Preferably, suitable crosslinkers are used to cause the coating to have the desired properties.

The present invention includes a silicone composition which can be sprayed from an aerosol can to form a gel and preferably comprises a silanol polymer, a cross linker, a catalyst, and a solvent. The silicone composition preferably comprises by weight: about 10-30% of the silanol polymer; about 2.85-11.8% of the cross linker; about 0.01-1.0% of the catalyst; and about 55-80% of the solvent. The silicone composition can comprise by weight: at least about 10% of the silanol polymer; at least about 2.85% of the cross linker; at least about 0.01% of the catalyst; and at least about 55% of the solvent. Preferably, the silanol polymer is at least one from the group consisting of $\alpha,\omega$-dihydroxy dimethyl polysiloxane silicone polymer, $\alpha,\omega$-dihydroxy dialkyl polysiloxane polymer, $\alpha,\omega$ di/trimethoxy dimethyl polysiloxane polymer, $\alpha,\omega$-dihydroxy dimethyl diphenyl polysiloxane polymer, and $\alpha,\omega$-dihydroxy dimethyl diphenyl polysiloxane polymer; the cross linker is at least one from the group consisting of methyl tris-(2-butanone oxime) silane, vinyl tris-(2-butanone oxime) silane, tetra (2-butanone oxime), and methyl trialkoxy silane; the catalyst is preferably at least one from the group consisting of dibutyl tin dilaurate, dibutyl tin diacetate, and dibutyl tin dioleate; and the solvent is pentane (preferably) or hexane.

The apparatus of the present invention preferably includes an aerosol can containing the composition. Preferably, the aerosol can has a foaming dispensary; the foaming dispensary can be, for example, a spray actuator OTP 0025. Preferably, there is a propellant in the can. Preferably, there is a spare spray actuator with the can.

The present invention also includes a method of providing a moisture resistant coating, comprising spraying the composition onto an object to be protected. The present invention also includes a method of providing a moisture resistant coating, comprising using the aerosol can to spray a coating onto an object to be protected. Typically, the object to be protected is wiring or an electrical connection.

The silanol polymer is preferably a dimethyl silanol polymer of 2,000, 3,500, or 4,000 centiStokes (cSts) viscosity, and preferably at least one from the group consisting of OH 2.0, OH 3.5, OH 4.0, and Dow Corning® 30-213; and the cross linker is at least one from the group consisting of OX10, OX-20, and OX-30.

Preferably, the composition has a viscosity of about 2,000-5,000 cps.

Preferably, the propellant is mixed with the composition such that the composition is 70-90% by weight and the propellant is 10-30% by weight.

The present invention also includes a spray-on moisture resistant coating produced by using the composition of the present invention. The moisture resistant coating is provided for at least one from the following group: telephone pedestals, the wiring of telephone pedestals, the connecting blocks of telephone pedestals, splices, joints, and other electrical connecting devices that are subject to environmental conditions.

Preferably, the gel has dielectric constant of about 2.0-4.0 @ 100 Hz, and more preferably not more than 3.7 @ 100 Hz.

Preferably, the composition is air cured.

Preferably, the aerosol can is flushed with nitrogen prior to filling.

Preferably, the silanol polymer is a silanol of:

a dialkyl polysiloxane polymer, a dialkyl diaryl polysiloxane copolymer, a dialkyl alkylaryl polysiloxane copolymer and/or a diaryl polysiloxane polymer. One, some, or all of these polymers/copolymers could be used in the formulation of the present invention.

The present invention includes a method of providing a spray-on moisture barrier, and the spray-on moisture barrier itself, for telephone pedestals (such as for the wiring of telephone pedestals and the connecting blocks of telephone pedestals), splices, joints and other electrical connecting devices that are subject to environmental conditions. The material preferably sprays on as a liquid and preferably catalyzes to a gel. The spray can be applied in for example one minute intervals. Each coat can provide about a 1-4 mil film, for example a 2-3 mil film. The film can be built up to about 1-125 mils, for example to about 10-40 mils, and typically to about 20-30 mils. A period of about 8-10 hours is typically needed for the material to completely dry. The material preferably has an extremely low dielectric (such as low as around 2.0-4.0 @ 100 Hz, typically around 2.3-3.7 @ 100 Hz, and e.g. 2.3 @

100 Hz), which makes it ideal for electrical applications. Once applied, the material can be wiped off with a clean rag at the time of application. If left alone, it will form a permanent moisture barrier.

The moisture barrier is preferably applied as follows:
1. make sure the wiring or surface to be sprayed, is substantially free of moisture and contaminants, and clean and/or dry if not;
2. hold the can 6-10 inches (e.g., 8 inches) away from the surface to be treated;
3. spray thin even coats (e.g., 1-4 mils thick) until the sprayed compound is seen to start to run;
4. spray from different angles to completely cover the connection;
5. allow to dry for 1-3 minutes (e.g., one minute) between coats;
6. if the button becomes clogged use a fresh button which is preferably included with each can.

The present invention includes as well a formulation similar to the above, but further comprising a molecular sieve. Preferably, the molecular sieve is dispersed in a mineral oil and comprises nanoparticles, which can pass through the orifice of the aerosol button on a typical can in which the formulation of the present invention is contained.

The purpose of the molecular sieve is to eliminate any appreciable or residual moisture or water in the cans to prevent premature curing, clogging or gelling within the aerosol can when filled. The molecular sieve has worked very well in the present invention.

The molecular sieve product used in the present invention can be MS Paste, commercially available from WR Grace. MS Paste is a molecular sieve of 2-4 microns in size dispersed in mineral oil. It should be small enough to pass through the 40 micron opening in a typical spray nozzle used with the present invention without sticking or clogging. The molecular sieve product can be for example 0-2.0% by weight in the formulation (replacing the same amount of the pentane or hexane) and the preferred weight amount is 0.25-1.0%, the more preferred weight amount is 0.30-0.90%, and the most preferred weight amount is 0.50-0.70%. Preferably there is at least 0.25% by weight, and typically more than about 1.00% by weight does not appreciably add to the effectiveness of the molecular sieve and thus may be considered wasteful.

The present invention including molecular sieves in a silicone RTV one-part aerosol formulation is commercially available from Anderson & Associates, LLC as AeroCure™ brand silicone spray.

The present invention also includes a method of using the formulation of the present invention as a tire shine. The present invention can be sprayed onto automotive rubber tires as a tire protectant/coating. Preferably, the tires are (at least substantially) free of any previous tire shine or silicone products. The present invention works best as the first and initial application to rubber tires. Preferably, the formulation of the present invention is applied from an aerosol can onto a tire from a distance of about 4-8 inches. Preferably, the application occurs closer rather than farther to avoid over spraying. When the present invention was applied onto other tires that were previously coated with a tire shine, the coating of the present invention exhibited relatively poor adhesion and relatively poor performance due to lack of durability. On clean, virgin tires, the protectant is expected to last on the tires for 2-3 months unless abraded off by scraping the tries against curbs or other roadway structures during driving.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
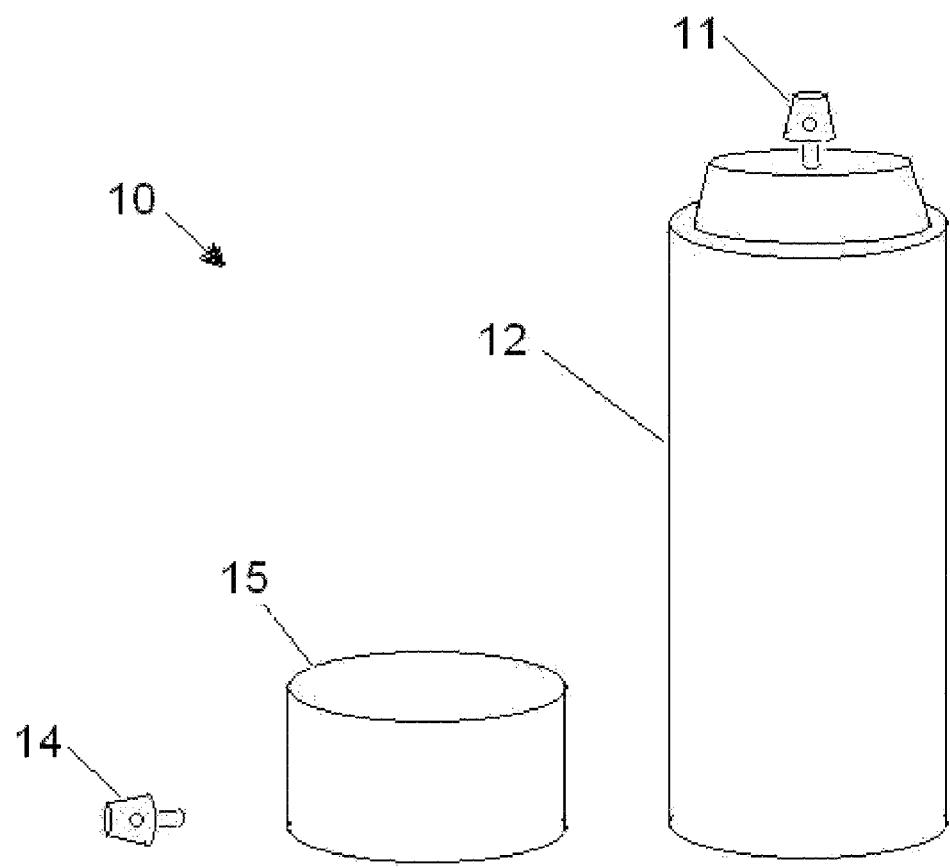
FIG. 1 is a perspective view of the preferred embodiment of the apparatus of the present invention.

The present invention includes a silicone gel which can be sprayed from an aerosol can.

FIG. 1 shows the apparatus 10 of the present invention, including an aerosol can 12 having a first spray actuator 11, a spare spray actuator 14, and a cap 15.

The silicone polymer preferably has a viscosity of 70-10,000 cps., more preferably has a viscosity of 1,000-6,000 cps., and most preferably has a viscosity of 2,000-5,000 cps. It is preferably sprayed from can 12 using Spray Actuator OTP 0025.

A formulation for a first embodiment of the present invention is set out below:

TABLE 1

Formulation of first embodiment

| Ingredient (alternatives) | Purpose | % by weight | Preferred % by weight | More Preferred % by weight | Most Preferred % by weight | Example % by weight |
|---|---|---|---|---|---|---|
| Silanol Polymer (4,000 cps.) | Polymer Coating | 21.0 | 15-30 | 18-24 | 19-22 | 21.0 |
| OX10 Methyl Oxime Silane (Methyl trialkoxy silane) | Crosslinker | 4.0 | 3.4-4.6 | 3.8-4.2 | 4.0 | 4.0 |
| Dibutyl Tin Diacetate (Dibutyl Tin Dilaurate or Dibutyl Tin Dioleate) | Catalyst | 0.006-0.50 | 0.006-0.35 | 0.006-0.20 | 0.006-0.10 | 0.015 |

TABLE 1-continued

Formulation of first embodiment

| Ingredient (alternatives) | Purpose | % by weight | Preferred % by weight | More Preferred % by weight | Most Preferred % by weight | Example % by weight |
|---|---|---|---|---|---|---|
| Pentane (Hexane) | Solvent | 75.0 | 65.8-76.2 | 70.9-76.1 | 74.0-76.0 | 75.0 |

The formulation is mixed with propellant (such as dimethyl ether) in a ratio such that, when mixed, the formulation is preferably 70-90% by weight and the propellant is preferably 10-30% by weight.

Spray-on Silicone

Primary Application: The present invention was designed to offer a spray-on moisture barrier for telephone pedestals and other telephone connecting devices that are subject to the environmental conditions. The idea is to spray on a silicone spray that catalyzes to a gel/coating and is air cured.

Technical details: The product is preferably a conventional silicone system which is air cured. It preferably has a reactive silicone polymer that is preferably silanol terminated/hydroxyl terminated. It preferably has a basic silicone backbone (PDMS). In the first embodiment of the present invention, there are preferably five ingredients as follows:

1 Silanol-functional Polymer; poyldimethyl siloxane
2 Cross Linker OX-10 {Methyl tris-(2-butanone oxime) silane};
3 Catalyst (tin based);
4 Propellant; and
5 Solvent (hydrocarbon-but California approved).

The spray is preferably designed to leave a 20-30 mil coating, typically applied in several layers. It is preferably designed for a median temperature of 72 degrees F. (22° C.) at a relative humidity of 50%. At this temperature and humidity, the skin-over time will preferably be less than 30 minutes, more preferably less than 15 minutes, even more preferably less than 5 minutes, more preferably less than 3 minutes, and most preferably less than 1 minute (typically the skin-over time is 1-3 minutes) and full cure will preferably take not more than 8-12, and preferably not more than 8 to 10 hours. It will preferably work at extreme temperature ends but the curing times will be affected. One could easily have a cold and hot weather version by altering the amount of catalyst (more catalyst (e.g. 0.05%) is preferably used for cold, dry weather while less catalyst (e.g. 0.02%) is preferably used for hot, humid weather).

Alternative Applications: The inventors see uses for this product in other markets such as automotive, construction, aerospace and household, and maritime.

Silicone Spray Coating

The present invention includes a curable silicone aerosol spray. The inventors decided to develop a silicone product that would cure and be applied from an aerosol can. Three preferred features of the present invention are (1) a non-slumping material for vertical surfaces (with a viscosity when first sprayed of preferably 15-40 cps.), (2) a relatively fast cure or skin-over time (such as preferably about 1-3 minutes) and (3) a relatively thick coating (such as 1-4 mils per layer).

A formulation for a second, preferred, embodiment of the present invention is set out below:

TABLE 2

Formulation of second embodiment

| Ingredient (preferred alternatives) | Purpose | % by weight | Preferred % by weight | More Preferred % by weight | Most Preferred % by weight | Example % by weight |
|---|---|---|---|---|---|---|
| OH 3.5 (OH 4.0*) | Polymer Coating | 10-30 | 15-30 | 18-24 | 19.0-22.0 | 21.0 |
| OX-20 (Methyl trialkoxy silane) | Crosslinker | 1.35-2.1 | 1.53-2.07 | 1.71-1.89 | 1.8 | 1.8 |
| OX-30 (Methyl trialkoxy silane) | Crosslinker | 1.50-2.5 | 1.87-2.53 | 2.09-2.31 | 2.2 | 2.2 |
| Dibutyl Tin Diacetate (Dibutyl Tin Dilaurate or Dibutyl Tin Dioleate) | Catalyst | 0.006-0.50 | 0.006-0.35 | 0.006-0.20 | 0.006-0.10 | 0.015 |
| Pentane (Hexane) | Solvent | 55-95 | Balance | Balance | Balance | 75.0 |

*Dow Corning ® 30-213 Polymer

The formulation is mixed with propellant (such as dimethyl ether) in a ratio such that, when mixed, the formulation is preferably 70-90% by weight and the propellant is preferably 10-30% by weight.

1. Pentane ($C_5H_{12}$)/Solvent:
This was selected to provide the best and preferred spray pattern along with the propellant. It is most preferred to use pentane since it provides the proper and preferred spray pattern and solvency. Other hydrocarbons, such as hexane or heptane can be used but have higher evaporation rate along with higher boiling points. The use of aromatic hydrocarbons, such as toluene or xylene were investigated but because industrial supplies of these chemicals can contain significant amounts of water, they were deemed unsuitable as a diluent or solvent resulting in too short of a shelf life.

2. Dimethyl Ether ($C_2H_6O$)/Propellant:
The dimethyl ether was chosen to achieve the preferred properties and spray of the formulation when dispensed from the aerosol can in combination with the pentane. The combination of the pentane and dimethyl ether proved to be very effective in meeting the inventors' requirements.

3. POLYMER OH 3.5 ($\alpha,\omega$-dihydroxy dimethyl polysiloxane silicone polymer):
(Manufacturer: Hanse Chemie AG, Dow Corning Corp. General Electric Corp. et al.)
This material is a basic polymer of 3,500 cps. viscosity and the ingredient that cures to a rubbery film or coating. The inventors' work and studies indicated that too low a viscosity (below 2,000 cps.) caused the formulation to slump or drip on vertical surfaces. Too high of a viscosity (above 5,000 cps.) resulted in some incompatibility with the solvent/propellant blend. Therefore, the viscosity of the silicone polymer is believed to be very important in the formulation.

4. Crosslinker OX-20 (Vinyl tris-(2-butanone oxime) silane):
(Manufacturer: Allied Honeywell, hanse chemie Ag & Nitro Chemie).
This crosslinker was selected because of its ability to produce a relatively fast skin-over time and is well known in the one-part sealant industry for this characteristic.

5. Crosslinker OX-30 (tetra (2-butanone oxime) silane in toluene):
(Manufacturer: Same as for Ox-20)
This crosslinker is a tetra-functional material that offers rapid curing and is important to achieve a cure within a few minutes (less than 3 or 4 minutes). Due to this property, it was evaluated and placed in the preferred formulation of the present invention.

6. Catalyst Dibutyl Tin Diacetate
(Manufacturer: Witco Chemical and Others)
This is a very common organo-tin RTV (Room Temperature Vulcanization) silicone catalyst to provide the curing between the silicone polymer, crosslinkers and atmospheric moisture. Too high a level causes premature curing or gelling within the container.

Other organo-tin catalysts were not studied or evaluated because stannous octoate is believed to be too strong a catalyst and susceptible to hydrolysis. Others were not studied and are usually not the catalyst of choice for one-part silicone RTV formulations. They are weaker catalysts than the dibutyl tin dilaurate. However, they may work satisfactorily as well.

If one were to use a catalyst other than dibutyl tin diacetate (TK-14), one could use, for example, dibutyl tin dioleate, dibutyl tin dilaurate (T-12), a 50% concentration of stannous octoate in dioctyl phthalate (DOP) (T-10), or least preferably 100% stannous octoate (T-9). When using dibutyl tin dioleate, one uses by weight 0.006-0.50 percent, preferably 0.006-0.40 percent, more preferably 0.006-0.25 percent, most preferably 0.006-0.15 percent (for example, 0.0175 percent). When using dibutyl tin dilaurate (T-12), one uses preferably the same amount as dibutyl tin diacetate (TK-14). When using a 50% concentration of stannous octoate in dioctyl phthalate (DOP) (T-10), one uses by weight 0.005-0.50 percent, preferably 0.005-0.35 percent, more preferably 0.005-0.20 percent, most preferably 0.005-0.10 percent (for example, 0.010 percent). When using 100% stannous octoate (T-9), one can use half as much by weight as T-10.

Other catalysts that could be used are di-2-ethylhexoate & ferric (III) chloride; the di-2-ethylhexoate could be used at the same level as dibutyl tin diacetate (TK-14).

Stannous octoate alone or at 50% concentration is the strongest organo-tin catalyst and would not be a preferred catalyst in this formulation. In addition, stannous octoate is easily hydrolyzed and has a limited shelf life. The 50% concentration in dioctyl phthalate, T-10, is better for hydrolytic stability, but is still too strong of a tin catalyst to be a preferred catalyst for the formulation of the present invention.

TABLE 3

Formulation of third embodiment

| Ingredient | Purpose | % by weight | Preferred % by weight | More Preferred % by weight | Most Example % by weight | % by weight |
|---|---|---|---|---|---|---|
| 4,000 cps. viscosity Silanol Polymer (dihydroxy dimethyl polysiloxane) (hanse chemie OH 3.5 or Dow Corning ® 30-213 or equivalent) | Polymer Coating | 21.00 | 19-23 | 20-22 | 20-22 | 21.00 |
| Oxime Silane (Methyl tris-(2-butanone oxime) silane-hanse chemie OX 10 or equivalent) | Crosslinker | 4.00 | 3.00-5.20 | 3.1-5.0 | 3.8-4.2 | 4.00 |

TABLE 3-continued

Formulation of third embodiment

| Ingredient | Purpose | % by weight | Preferred % by weight | More Preferred % by weight | Most Preferred % by weight | Example % by weight |
|---|---|---|---|---|---|---|
| Oxime Silane (Vinyl tris-(2-butanone oxime) silane (hanse chemie OX 20 or equivalent)) | Crosslinker | 2.00 | 1.45-2.55 | 1.5-2.5 | 1.85-2.15 | 2.00 |
| Oxime Silane (tetra (2-butanone oxime) in toluene (hanse chemie OX 30 or equivalent)) | Crosslinker | 1.00 | 0.55-1.35 | 0.6-1.3 | 0.90-1.10 | 1.00 |
| Dibutyl Tin Diacetate (Dibutyl Tin Dilaurate or Dibutyl Tin Dioleate) | Catalyst | 0.006-0.50 | 0.006-0.35 | 0.006-0.20 | 0.006-0.10 | 0.015 |
| DME Dimethyl ether | Propellant | 25.20 | 25.20 | 25.20 | 25.20 | 25.20 |
| Pentane (Hexane) | Solvent | Balance | Balance | Balance | Balance | 46.785 |

Spray Actuator OTP 0025 is preferably used to dispense the formulation of the present invention from an aerosol can. Spray Actuator OTP 0025 is commercially available from Newman-Green, Inc., of Addison, Ill., http://www.newman-green.com/, as sprayhead model no. 120-24-18, having a slot size of 0.024 inch and an orifice diameter of 0.018 inch. A standard aerosol valve could be used, but preferably a vapor tap valve is used.

Using a vapor tap valve eliminates the need to invert the can and flush it before repeated use. Preferably, the vapor tap valve is one commercially available from Newman-Green, Inc., of Addison, Ill., http://www.newman-green.com/, as Model No. C-10-123 (with 795-013 VT).

It is preferable that all aerosol cans be flushed with nitrogen prior to filling to eliminate any moist, humid air in the cans before filling with the ingredients. This is done to insure a dry atmosphere prior to filling.

An embodiment of the present invention without the molecular sieve was first commercially available from Utilx as P/N 819081 around June 2003. A modified version of the text of the instructions for its use follows:

Silicone Protective Coating
Utilx P/N 819081
This product has been developed to provide a spray-on moisture barrier for telephone pedestals, splices, joints and other connecting devices that are subject to environmental conditions. The material sprays on as a liquid and catalyzes to a gel. The spray can be applied in one minute intervals. Each coat will provide a 1-4 mil film. The film can be built up to 1-125 mils. A period of for example 8-10 hours is needed for the material to completely dry.
The material has an extremely low dielectric (preferably below 3.45 @ 100 Hz), which makes it ideal for electrical applications. Once applied, the material can be wiped off with a clean rag. If left alone, it will form a permanent moisture barrier.
Directions:
1. Make sure the wiring or surface to be sprayed, is free of moisture and contaminants.
2. Hold the can around 10 inches away from the surface to be treated.
3. Spray thin even coats until the sprayed compound is seen to start to run.
4. Spray from different angles to completely cover the connection.
5. Allow to dry for more than one minute between coats.
6. If the button becomes clogged use a fresh button that is included with each can.

Incorporated herein by reference is the MSDS attached to U.S. Provisional Patent Application Ser. No. 60/489,818, filed 24 Jul. 2003.

The present invention includes as well formulations similar to those in Tables 1, 2, and 3 above, but further comprising a molecular sieve. Preferably, the molecular sieve is dispersed in a mineral oil and comprises nanoparticles, which can pass through the orifice of the aerosol button on a typical can in which the formulation of the present invention is contained.

The purpose of the molecular sieve is to eliminate any appreciable moisture or water in the cans to prevent premature curing, clogging or gelling within the aerosol can when filled. The molecular sieve has worked very well in the present invention.

The molecular sieve product used in the present invention can be MS Paste, commercially available from WR Grace. MS Paste is a molecular sieve of 2-4 microns in size dispersed in mineral oil. It should be small enough to pass through the 40 micron opening in a typical spray nozzle used with the present invention without sticking or clogging. The molecular sieve product can be for example 0-2.0% by weight in the formulation (replacing the same amount of the pentane or hexane) and the preferred weight amount is 0.25-1.0%, the more preferred weight amount is 0.30-0.90%, and the most preferred weight amount is 0.50-0.70%. Preferably there is at least 0.25% by weight, and typically more than about 1.00% by weight does not appreciably add to the effectiveness of the molecular sieve and thus may be considered wasteful.

The present invention also includes a method of using the formulation of the present invention as a tire shine. The present invention can be sprayed onto automotive rubber tires as a tire protectant/coating. Preferably, the tires are at least substantially free of any previous tire shine or silicone products. The present invention works best as the first and initial application to rubber tires. Preferably, the formulation of the present invention is applied from an aerosol can onto a tire from a distance of about 4-8 inches. Preferably, the application occurs closer rather than farther to avoid overspraying. When the present invention was applied onto other tires that were previously coated with a tire shine, the coating of the present invention exhibited relatively poor adhesion and relatively poor performance due to lack of durability. On clean, virgin tires, the protectant is expected to last on the tires for 2-3 months unless abraded off by scraping the tires against curbs or other roadway structures during driving. The tires are preferably cleaned (as with mineral spirits, xylene or similar solvents) before the composition of the present invention is applied.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of using a silicone composition as a tire shine, comprising:
    (a) providing, in a form allowing it to be sprayed, a silicone composition which can be sprayed from an aerosol can to form a gel, comprising:
    a silanol polymer;
    a cross linker;
    a catalyst;
    a solvent;
    (b) spraying the composition onto an automotive rubber tire, wherein the composition comprises by weight:
    at least about 10% of the silanol polymer;
    at least about 0.01% of the catalyst;
    at least about 55% of the solvent.

2. The method of claim 1, wherein the composition is applied from an aerosol can onto a tire from a distance of about 4-8 inches.

3. The method of claim 1, wherein the tire is substantially free of any previous tire shine or silicone products before the composition is applied.

4. The method of claim 1, further comprising cleaning the tire of substantially any previous tire shine or silicone products before the composition is applied.

5. The method of claim 1, wherein the composition has a viscosity of about 2,000-5,000 cps.

6. The method of claim 1, wherein the composition sprays on as a liquid and changes to a gel.

7. The method of claim 1, wherein the composition is air cured.

8. The method of claim 1, wherein:
    when sprayed onto a surface, the composition provides a coating about 1-125 mils thick.

9. The method of claim 1, wherein:
    when sprayed onto a surface, the composition provides a coating about 10-40 mils thick.

10. The method of claim 1, wherein:
    when sprayed onto a surface, the composition provides a coating about 20-30 mils thick.

11. A method of using a silicone composition as a tire shine, comprising:
    (a) providing, in a form allowing it to be sprayed, a silicone composition which can be sprayed from an aerosol can to form a gel, comprising:
    a silanol polymer;
    a cross linker;
    a catalyst;
    a solvent;
    (b) spraying the composition onto an automotive rubber tire, wherein the composition comprises by weight:
    about 10-30% of the silanol polymer;
    about 2.85-11.8% of the cross linker;
    about 0.01-1.0% of the catalyst;
    about 55-80% of the solvent.

12. A method of using a silicone composition as a tire shine, comprising:
    (a) providing, in a form allowing it to be sprayed, a silicone composition which can be sprayed from an aerosol can to form a gel, comprising:
    a silanol polymer;
    a cross linker;
    a catalyst;
    a solvent;
    (b) spraying the composition onto an automotive rubber tire, wherein the composition comprises by weight:
    at least about 10% of the silanol polymer;
    at least about 2.85% of the cross linker;
    at least about 0.01% of the catalyst;
    at least about 55% of the solvent.

13. A method of using a silicone composition as a tire shine, comprising:
    (a) providing, in a form allowing it to be sprayed, a silicone composition which can be sprayed from an aerosol can to form a gel, comprising:
    a polymer;
    a cross linker;
    a catalyst;
    a solvent;
    (b) spraying the composition onto an automotive rubber tire, wherein:
    the polymer is at least one from the group consisting of $\alpha,\omega$-dihydroxy dimethyl polysiloxane silicone polymer, $\alpha,\omega$-dihydroxy dialkyl polysiloxane polymer, $\alpha,\omega$ di/trimethoxy dimethyl polysiloxane polymer, and $\alpha,\omega$-dihydroxy dimethyl diphenyl polysiloxane polymer;
    the cross linker is at least one from the group consisting of methyl tris-(2-butanone oxime) silane, vinyl tris-(2-butanone oxime) silane, tetra (2-butanone oxime) silane, and methyl trialkoxy silane;
    the catalyst is at least one from the group consisting of dibutyl tin dilaurate, dibutyl tin diacetate, and dibutyl tin dioleate; and
    the solvent is pentane.

14. A method of using a silicone composition as a tire shine, comprising:
    (a) providing, in a form allowing it to be sprayed, a silicone composition which can be sprayed from an aerosol can to form a gel, comprising:
    a polymer;
    a cross linker;

a catalyst;
a solvent;
(b) spraying the composition onto an automotive rubber tire, wherein:
the polymer is at least one from the group consisting of α,ω-dihydroxy dimethyl polysiloxane silicone polymer, α,ω-dihydroxy dialkyl polysiloxane polymer, α,ω di/trimethoxy dimethyl polysiloxane polymer, α,ω-dihydroxy dimethyl diphenyl polysiloxane polymer, and α,ω-dihydroxy dimethyl methylphenyl polysiloxane copolymer; and
the cross linker is at least one from the group consisting of methyl oxime silane, methyl tris-(2-butanone oxime) silane, vinyl tris-(2-butanone oxime) silane, tetra (2-butanone oxime) silane, and methyl trialkoxy silane.

15. A method of using a silicone composition as a tire shine, comprising:
(a) providing, in a form allowing it to be sprayed, a silicone composition which can be sprayed from an aerosol can to form a gel, comprising:
a silanol polymer;
a cross linker;
a catalyst;
a solvent;
(b) spraying the composition onto an automotive rubber tire, wherein the composition comprises:
20-22% by weight 4,000 cps. viscosity dihydroxy dimethyl polysiloxane;
3.0-5.0% by weight methyl tris-(2-butanone oxime) silane;
1.5-2.5% by weight vinyl tris-(2-butanone oxime) silane;
0.6-1.3% by weight tetra-(2-butanone oxime) in toluene;
0.01-0.02% by weight dibutyl tin diacetate;
25.20% by weight dimethyl ether; and
pentane in an amount to make 100% by weight.

16. The method of claim 15, wherein the composition comprises:
20-22% by weight 4,000 cps. viscosity dihydroxy dimethyl polysiloxane;
3.8-4.2% by weight methyl tris-(2-butanone oxime) silane;
1.85-2.15% by weight vinyl tris-(2-butanone oxime) silane;
0.90-1.10% by weight tetra-(2-butanone oxime) in toluene;
0.01-0.02% by weight dibutyl tin diacetate;
25.20% by weight dimethyl ether; and
pentane in an amount to make 100% by weight.

17. The method of claim 15, wherein the composition comprises about:
21.00% by weight 4,000 cps. viscosity dihydroxy dimethyl polysiloxane;
4.00% by weight methyl tris-(2-butanone oxime) silane;
2.00% by weight vinyl tris-(2-butanone oxime) silane;
1.00% by weight tetra-(2-butanone oxime) in toluene;
0.015% by weight dibutyl tin diacetate;
25.20% by weight dimethyl ether; and
46.135% by weight pentane.

* * * * *